United States Patent Office 2,811,546
Patented Oct. 29, 1957

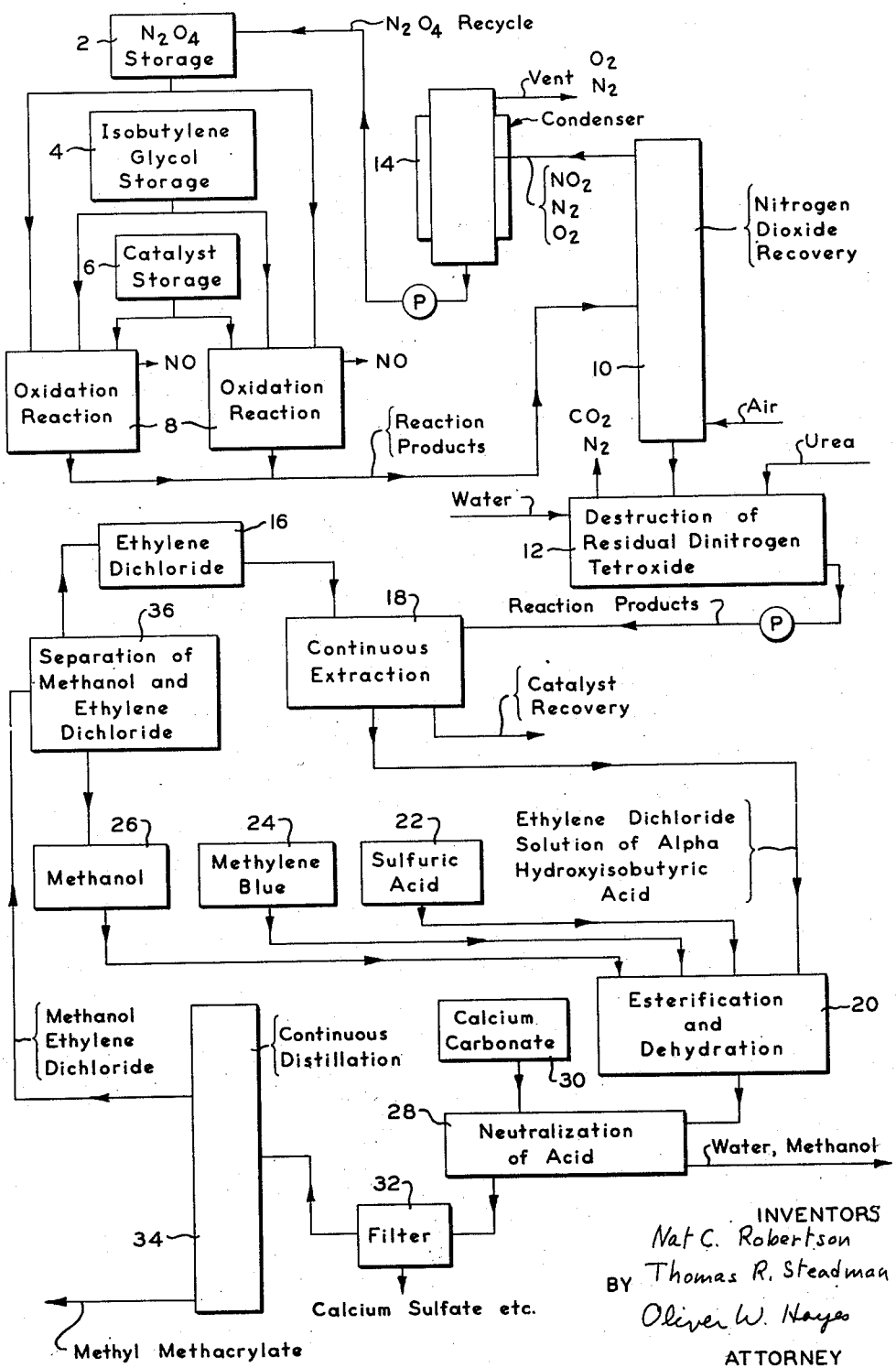

2,811,546

PRODUCTION OF α-HYDROXY ISOBUTYRIC AND METHACRYLIC ACIDS AND THEIR ESTERS

Nat C. Robertson, Wellesley, and Thomas R. Steadman, Waban, Mass., assignors to Escambia Chemical Corporation, Pace, Fla., a corporation of Delaware Continuation of application Serial No. 361,272, June 12, 1953. This application September 11, 1956, Serial No. 610,044

11 Claims. (Cl. 260—486)

This invention relates to improved processes for production of valuable chemicals from constituents of natural gas. This application is a continuation-in-part of our copending application Serial No. 347,276, filed April 7, 1953 now abandoned and a continuation of our copending application Serial No. 361,272 filed June 12, 1953 and now abandoned.

A principal object of the present invention is to provide an economical integrated process for making methacrylic acid and esters thereof from constituents of natural gas such as isobutane.

Another object of the invention is to provide an improved process for the production of the valuable intermediate compound alpha hydroxyisobutyric acid.

Still another object of the invention is to provide an improved process for oxidizing isobutylene glycol to alpha hydroxyisobutyric acid.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing which is a flow sheet illustrating one preferred embodiment of the present invention.

Methacrylic acid and its esters, such as the ethyl and methyl methacrylates, are very valuable chemicals which have found wide utility in the plastic industry. The production of these chemicals has, in the past, involved relatively complex procedures and has required the use of relatively expensive starting materials. In the present invention constituents of natural gas, such as isobutane, may be utilized as the starting material. As explained in the copending application of Robertson et al., Serial No. 316,158, filed October 22, 1952, it is economically possible to oxidize isobutane to obtain high yields of isobutylene glycol.

The present invention is particularly directed to the conversion of isobutylene glycol to methacrylic acid or esters thereof. A particular aspect of the present invention is directed to the selective oxidation of isobutylene glycol so that only the primary hydroxyl group thereof is converted to the carboxyl group. In one preferred embodiment of the invention the isobutylene glycol is oxidized by means of dinitrogen tetroxide ($N_2O_4$) to alpha hydroxyisobutyric acid which is subsequently converted to methacrylic acid or suitable esters thereof. Dinitrogen tetroxide is an equilibrium mixture of the monomer ($NO_2$) and the dimer ($N_2O_4$). The equilibrium concentration of the monomer is a function of temperature as described in Ephraim "Inorganic Chemistry," page 667, 3rd edition, Nordeman. When used in the specification and the claims the expression "dinitrogen tetroxide" is intended to include the equilibrium concentration of the monomer at the temperature employed.

The reaction between the isobutylene glycol and dinitrogen tetroxide preferably takes place with at least a stoichiometric amount of the dinitrogen tetroxide necessary to selectively oxidize the primary hydroxyl group of the isobutylene glycol. This reaction is preferably carried out at a relatively low temperature. The oxidation also preferably takes place in the presence of a substantial amount of a catalyst selected from the group consisting of the hydroxides, carbonates, nitrates, and nitrites of sodium, potassium, lithium, and barium, and the oxides of aluminum and iron.

Referring now to the drawing, there is illustrated a flow sheet which embodies one method of practicing the present invention. In the flow sheet there are shown a plurality of oxidation reactors indicated by the numeral 8. For the sake of simplicity only two such reactors are shown, although there may be more than two. Each reactor 8 is arranged to be fed with the preferred quantities of reactants. The dinitrogen tetroxide is supplied to the reactors 8 from a storage tank 2, and is mixed with the preferred proportions of isobutylene glycol and a suitable basic catalyst (e. g., potassium carbonate) supplied from storage sources 4 and 6, respectively. Upon completion of the controlled dinitrogen tetroxide oxidation of isobutylene glycol to alpha hydroxyisobutyric acid, the reaction mixture is drained into chamber 10 wherein a stream of dry air is blown over or through the reaction mixture so as to remove any volatile nitrogen compounds (e. g., NO and $NO_2$) and to simultaneously oxidize NO to $NO_2$. The volatile nitrogen compounds removed in this manner escape at the top of chamber 10 and are passed through condenser 14. The dinitrogen tetroxide thus recovered is recycled back to the storage tank 2. If desired, a suitable purifying means may be employed prior to returning the recovered dinitrogen tetroxide to the storage tank.

The reaction mixture, substantially freed of oxides of nitrogen, is run into chamber 12 where it is treated with a saturated water solution of urea, sulfamic acid or the like to destroy any residual nitrogen compounds. The resulting aqueous solution is then pumped to a continuous extractor 18, where it is extracted with a suitable solvent such as ethylene dichloride. The ethylene dichloride solution of alpha hydroxyisobutyric acid so obtained is fed to an esterification and dehydration reactor 20. Sufficient quantities of sulfuric acid and an alcohol (e. g., methanol) from supply sources 22 and 26, respectively, are added to the ethylene dichloride solution of alpha hydroxyisobutyric acid so as to simultaneously esterify and dehydrate the acid to methyl methacrylate. The esterification and dehydration is carried out in the presence of a small quantity of methylene blue (or any other suitable polymerization inhibitor) supplied from source 24 so as to prevent polymerization. The resulting acidic solution of methyl methacrylate is then neutralized at 28 with a calcium carbonate solution from supply 30. The neutralized mixture is then passed through filter 32 to remove any insoluble materials such as calcium sulfate. The filtrate is run into a continuous distillation still 34 wherein the various components of the filtrate are separated. The solvent, ethylene dichloride, and unreacted methanol are recovered. The methanol is preferably separated from the ethylene dichloride before returning these products back to their respective supplies. The methyl methacrylate recovered from the distillation still 34 may be led to suitable storage tanks or to suitable purifying means.

Specific detailed methods of practicing the present invention are set forth in the following nonlimiting examples which are directed more specifically to the step of oxidizing the isobutylene glycol to alpha hydroxyisobutyric acid.

*Example I*

10.2 grams of isobutylene glycol were charged to a reaction vessel and cooled in an ice bath at 0° C. The cooled glycol was mixed with 15.0 grams of dinitrogen tetroxide ($NO_2 \leftrightarrow N_2O_4$) also cooled to 0° C. and the reaction mixture was maintained at substantially 0° C. for 48 hours. At the end of this time, the major portion of the nitrogen oxides present were removed by passing a stream of dry air over the reaction mixture for a period of 30 minutes. The residual nitrogen oxides present were destroyed by adding a saturated solution of urea in water at room temperature until no further evolution of gases occurred. The resulting solution was made alkaline with sodium hydroxide and extracted continuously with diethyl ether for 20 hours. The ether was then evaporated off on a steam bath and the residue was analyzed for unreacted glycol. The alkaline solution was made acidic with an inorganic acid ($H_2SO_4$, HCl, etc.) and then extracted with ether. The ether was evaporated off on a steam bath and the residue was dissolved in benzene and freed of water by azeotropic distillation. The dry benzene solution was evaporated to a small volume, cooled, and a crop of crystals of alpha hydroxyisobutyric acid amounting to 4.9 grams resulted. The yield of alpha hydroxyisobutyric acid was thus 41.8 percent of the theoretical based on the original quantity of isobutylene glycol charged. 5.6 wt. percent of other acids were recovered from the alpha hydroxyisobutyric acid mother liquors. 1.21 grams of isobutylene glycol were also recovered by evaporation of the ether solution obtained by extraction of the alkaline reaction mixture.

Although the oxidation proceeds smoothly to produce reasonably good yields of alpha hydroxyisobutyric acid in the absence of catalysts, even higher yields may be obtained by the use of a suitable basic catalyst as shown in the following example.

*Example II*

9.98 grams of isobutylene glycol, 5.0 grams of potassium carbonate ($K_2CO_3$) and 50 ml. of dinitrogen tetroxide ($NO_2 \leftrightarrow N_2O_4$) were charged to a reaction vessel. The reaction mixture was maintained at substantially room temperature (25° C.) for 24 hours. At the end of this time, the major portion of the nitrogen oxides present were removed by evaporation in a stream of dry air over a period of 30 minutes. Any residual nitrogen oxides were destroyed by adding a saturated solution of sulfamic acid in water at room temperature until no further evolution of gases occurred. The resulting solution was saturated with potassium carbonate and then extracted with butanol. The butanol extract was analyzed for any unreacted glycol. The aqueous solution was made acidic and extracted with ether. The ether was evaporated off on a steam bath, and the residue was dissolved in benzene and freed of water by azeotropic distillation. The dry benzene solution was evaporated to a small volume, cooled, and a crop of alpha hydroxyisobutyric acid crystals amounting to 7.14 grams resulted. This oxidation of isobutylene glycol resulted in a yield of alpha hydroxyisobutyric acid of 61.8 percent of theoretical based on the isobutylene glycol charged. A small percent of isobutylene glycol and unidentified acidic material was also recovered.

*Example III*

Isobutylene glycol was oxidized under conditions similar to those described in Example II except for the fact that 4.4 grams of sodium hydroxide were used in place of the potassium carbonate to give a yield of 51.6 percent of alpha hydroxyisobutyric acid.

*Example IV*

Isobutylene glycol was oxidized under conditions similar to those described in Example II except for the fact that 21.7 grams of barium carbonate were used in place of the potassium carbonate to give a yield of 54.0 percent of alpha hydroxyisobutyric acid.

*Example V*

Isobutylene glycol was oxidized under conditions similar to those described in Example II except for the fact that 7.5 grams of alumina ($Al_2O_3$) were used in place of the potassium carbonate to give a yield of 42.2 percent of alpha hydroxyisobutyric acid.

*Example VI*

Isobutylene glycol was oxidized under conditions similar to those described in Example II except for the fact that 11.7 grams of iron oxide ($Fe_2O_3$) were used in place of the potassium carbonate to give a yield of 40.0 percent of alpha hydroxyisobutyric acid.

*Example VII*

Isobutylene glycol was oxidized under conditions similar to those described in Example II except for the fact that 6.2 grams of potassium hydroxide were used in place of the potassium carbonate to give a yield of 47.8 percent of alpha hydroxyisobutyric acid.

*Example VIII*

Isobutylene glycol was oxidized under conditions similar to those described in Example II except for the fact that 6.72 grams of lithium carbonate were used in place of potassium carbonate to give a yield of 48.0 percent of alpha hydroxyisobutyric acid.

*Example IX*

9.73 grams of isobutylene glycol, 11.12 grams of potassium nitrate ($KNO_3$) and 50 mls. of dinitrogen tetroxide were charged to a reaction vessel. The reaction mixture was maintained at substantially room temperature (25° C.) during the charging operation and for 24 hours afterwards. At the end of this time, the major portion of the nitrogen oxides present were removed by evaporation in a stream of dry air over a period of 30 minutes. Any residual nitrogen oxides were destroyed by adding a saturated solution of sulfamic acid in water at room temperature until no further evolution of gases occurred. The resulting solution was made basic with sodium hydroxide and then saturated with potassium carbonate followed by a butanol extraction. The butanol extract was analyzed for any unreacted glycol. The aqueous solution was made acidic with sulfuric acid to a pH of 1 and extracted with ether for 24 hours. The ether was evaporated off on a steam bath and the residue was dissolved in benzene and freed of water by azeotropic distillation. The dry benzene solution was evaporated to a small volume, cooled, and a crop of alpha hydroxyisobutyric acid crystals amounting to 5.42 grams resulted. This oxidation of isobutylene glycol resulted in a yield of alpha hydroxyisobutyric acid of 48.3 percent of theoretical based on the isobutylene glycol charged. 14.1 percent of unreacted isobutylene glycol was also recovered.

*Example X*

Isobutylene glycol was oxidized under conditions similar to those described in Example IX except for the fact that 9.36 grams of potassium nitrite ($KNO_2$) were used in place of the potassium nitrate to give a yield of 65.0 percent of alpha hydroxyisobutyric acid. 13.4 percent of unreacted isobutylene glycol was also recovered.

*Example XI*

Isobutylene glycol was oxidized under conditions similar to those described in Example IX except for the fact that 9.35 grams of sodium nitrate ($NaNO_3$) were used in place of potassium nitrate to give a yield of 66.0 percent of alpha hydroxyisobutyric acid. 14.5 percent of unreacted isobutylene glycol was also recovered.

This oxidation as described in the preceding examples proceeds essentially as follows:

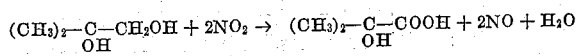

The oxidation of isobutylene glycol will take place when at least the stoichiometric amount of dinitrogen tetroxide required for the reaction is present. However, better results have been obtained when there is an excess of oxidizing agent present. The excess dinitrogen tetroxide present may be varied over a wide range, but it has been found preferable to use an amount of the dinitrogen tetroxide which is at least 50 percent in excess over the stoichiometric amount needed to selectively oxidize the primary alcohol group.

The reaction may be carried out at a temperature in the range of from 0° C. to 35° C. and in the presence or absence of any suitable solvents. However, the use of a solvent is less desirable since reactions employing solvents such as acetic acid, ether, and chloroform have in no instance produced yields of alpha hydroxyisobutyric acid as high as those obtained in the absence of solvents.

The time of reaction may be varied so that, for example, very much shorter periods are satisfactory. Yields of product amounting to 35% were obtained with sodium carbonate present, with a reaction time of one hour. Under such circumstances, however, substantial quantities of the isobutylene glycol are recovered unchanged.

As pointed out above, the present process may be satisfactorily practiced without the aid of a catalyst. However, the presence of catalysts have given considerably higher yields. The preferred catalysts are carbonates, hydroxides, nitrates, and nitrites of sodium, potassium, lithium, and barium. Such compounds as NaOH, KOH, Na₂CO₃, NaHCO₃, K₂CO₃, BaCO₃, Li₂CO₃, KNO₃, KNO₂, NaNO₃, etc. are all satisfactory catalysts. It has also been found that oxides of iron and aluminum may also be employed as catalysts.

When catalysts such as the carbonates and hydroxides (or oxides) are employed, it is believed that an appreciable amount of nitrates and/or nitrites are formed from the hydroxides (or oxides) and carbonates during the oxidation reaction. Thus, in all dinitrogen tetroxide oxidations employing a catalyst of the above mentioned preferred groups, there may also be present the corresponding nitrates and/or nitrites.

As pointed out above, upon completion of the oxidation most of the nitrogen oxides present are removed from the reaction mixture by passing a stream of dry air over or through the mixture. This also converts any dissolved NO to NO₂. The small amounts of residual dinitrogen tetroxide still in the reaction mixture can then be destroyed by the addition of a saturated water solution of urea, hydrazine, or sulfamic acid, or other similar compounds.

The extraction of the desired acid from the reaction mixture may be done by any of the well-known chemical procedures. Other methods of separation than those described may be employed such as, for example, the removal of the acid by formation of the insoluble zinc salt.

In connection with the specific flow sheet illustrated in the drawing, it should be pointed out that numerous modifications may be made in the various techniques employed without departing from the scope of the invention. For example, if methacrylic acid is the desired end product rather than the methacrylate, the esterification step is eliminated and the alpha hydroxyisobutyric acid is simply dehydrated to methacrylic acid by use of a suitable strong mineral acid, such as sulfuric or phosphoric acids.

Equally, many esters of methacrylic acid other than the methyl ester may be made by utilizing a different alcohol. Examples of such suitable alcohols are the aliphatic straight chain alcohols ethyl, propyl, butyl, etc. In a similar manner, the specific reagents employed in the various neutralization and reaction steps may be replaced by numerous equivalent chemicals. For example, the ethylene dichloride solvent can be replaced by numerous other solvents such as methylene dichloride, carbon tetrachloride and similar low-boiling halogenated hydrocarbons. Numerous other acids and bases may be used in place of the specific reagents (H₂SO₄ and CaCO₃) employed in the illustrated flow sheet. In like manner, many other polymerization inhibitors such as para tertiary butyl catechol or hydroquinone may be substituted for the methylene blue.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

1. A process for the production of methacrylates which comprises the steps of oxidizing isobutylene glycol with dinitrogen tetroxide, said dinitrogen tetroxide being used in at least 50 percent excess of the stoichiometric amount required to selectively oxidize the primary alcohol group to form alpha hydroxyisobutyric acid, esterifying said alpha hydroxyisobutyric acid with a primary aliphatic alcohol to form the corresponding ester, and dehydrating the ester to form the methacrylate.

2. A process for the production of methacrylates which comprises the steps of oxidizing isobutylene glycol with dinitrogen tetroxide, said dinitrogen tetroxide being used in at least 50 percent excess of the stoichiometric amount required to selectively oxidize the primary alcohol group to form alpha hydroxyisobutyric acid, esterifying said alpha hydroxyisobutyric acid with an alcohol to form the corresponding ester, and dehydrating the ester to form the methacrylate.

3. A process for the production of methacrylic acid which comprises the steps of oxidizing isobutylene glycol with dinitrogen tetroxide, said dinitrogen tetroxide being used in at least 50 percent excess of the stoichiometric amount required to selectively oxidize the primary alcohol group to form alpha hydroxyisobutyric acid, and dehydrating said acid to form methacrylic acid.

4. A process for the production of alpha hydroxyisobutyric acid which comprises oxidizing isobutylene glycol with dinitrogen tetroxide, said dinitrogen tetroxide being used in at least 50 percent excess of the stoichiometric amount required to selectively oxidize the primary alcohol group.

5. A process for the production of esters of alpha hydroxyisobutyric acid which comprises oxidizing isobutylene glycol with dinitrogen tetroxide, said dinitrogen tetroxide being used in at least 50 percent excess of the stoichiometric amount required to selectively oxidize the primary alcohol group to form alpha hydroxyisobutyric acid, and esterifying said alpha hydroxyisobutyric acid with an alcohol to form the corresponding ester.

6. A process for the production of alpha hydroxyisobutyric acid which comprises oxidizing isobutylene glycol with dinitrogen tetroxide in the presence of a catalyst from the group consisting of the hydroxides, carbonates, nitrates, and nitrites of sodium, potassium, lithium, and barium, and the oxides of iron and aluminum, said dinitrogen tetroxide being used in at least 50 percent excess of the stoichiometric amount required to selectively oxidize the primary alcohol group, and isolating alpha hydroxyisobutyric acid from said reaction mixture.

7. A process according to claim 6 wherein said catalyst is alumina.

8. A process according to claim 6 wherein said catalyst is ferric oxide.

9. The process of claim 6 wherein said catalyst comprises potassium carbonate.

10. The process of claim 6 wherein said catalyst comprises potassium nitrite.

11. The process of claim 6 wherein said catalyst comprises sodium nitrate.

References Cited in the file of this patent

UNITED STATES PATENTS

| | | |
|---|---|---|
| 2,267,377 | Olin | Dec. 23, 1941 |
| 2,298,387 | Kenyon | Oct. 13, 1942 |
| 2,356,247 | Kirk et al. | Aug. 22, 1944 |
| 2,360,880 | Kropa | Oct. 24, 1944 |

OTHER REFERENCES

Klemenc: Chem. Abst. 42 (1948) 6221i.
Degering et al.: J. Am. Chem. Soc. 73 (1951) 848–9.
Groggins: "Unit Processes," 4th ed. (1952) 425–6.